(12) United States Patent
Akhlaque-e-rasul et al.

(10) Patent No.: US 10,029,734 B2
(45) Date of Patent: Jul. 24, 2018

(54) ROCKER INSERT FORMED BY CONNECTED TUBULAR MEMBERS

(71) Applicant: Ford Global Technologies, LLC, Dearborn, MI (US)

(72) Inventors: Shaikh Akhlaque-e-rasul, Windsor (CA); Zhenyan Gao, Northville, MI (US); Cheng Luo, Dearborn Heights, MI (US); William Moore Sherwood, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/004,355

(22) Filed: Jan. 22, 2016

(65) Prior Publication Data
US 2017/0210427 A1 Jul. 27, 2017

(51) Int. Cl.
*B62D 21/15* (2006.01)
*B62D 25/02* (2006.01)
*B62D 27/02* (2006.01)

(52) U.S. Cl.
CPC ......... *B62D 21/157* (2013.01); *B62D 25/025* (2013.01); *B62D 27/026* (2013.01)

(58) Field of Classification Search
CPC .. B62D 21/152; B62D 21/157; B62D 25/025; B62D 27/026
See application file for complete search history.

(56) References Cited

U.S. PATENT DOCUMENTS

| | | | |
|---|---|---|---|
| 3,596,979 A * | 8/1971 | Hablitzel | B62D 25/025 296/181.2 |
| 5,480,729 A | 1/1996 | Hattori et al. | |
| 6,193,306 B1 * | 2/2001 | Lee | B62D 25/02 296/181.4 |
| 6,312,028 B1 * | 11/2001 | Wilkosz | B60R 19/18 188/377 |
| 6,354,656 B1 | 3/2002 | Hwang | |
| 6,409,257 B1 | 6/2002 | Takashima et al. | |
| 7,226,120 B2 | 6/2007 | Yamazaki | |
| 7,347,486 B2 | 3/2008 | Uchida et al. | |

(Continued)

FOREIGN PATENT DOCUMENTS

| | | | | |
|---|---|---|---|---|
| DE | 2551892 A1 * | 5/1976 | | B60R 19/02 |
| DE | 19716223 C1 * | 11/1998 | | B60R 19/34 |

(Continued)

*Primary Examiner* — Darrell G Dayoan
*Assistant Examiner* — Paul A Chenevert
(74) *Attorney, Agent, or Firm* — Jason Rogers; Brooks Kushman P.C.

(57) ABSTRACT

An elongated beam, or rocker assembly, is disclosed that includes a first panel and a second panel attached to the first panel to define a cavity. A reinforcement is disposed in the cavity that includes a first tubular member adhesively connected to the first panel inside the cavity and a pair of tubular members are connected with an adhesive to the second panel, to each other, and the first tubular member. The tubular members are arranged in a triangular array within the cavity and extend along the length of the elongated beam. The wall thickness and bending strength of the tubular members are selected to provide an insert that collapses preferentially with the outer tubular member of the insert collapsing before the inner tubular members.

14 Claims, 4 Drawing Sheets

(56) References Cited

U.S. PATENT DOCUMENTS

| | | | |
|---|---|---|---|
| 7,413,240 B2 * | 8/2008 | Rashidy | B60J 7/04 |
| | | | 296/187.12 |
| 7,594,691 B2 | 9/2009 | Koormann et al. | |
| 7,884,704 B2 | 2/2011 | Iwano et al. | |
| 8,322,780 B2 | 12/2012 | Nagwanshi et al. | |
| 8,696,051 B2 | 4/2014 | Charbonneau et al. | |
| 9,033,404 B2 | 5/2015 | Meaige et al. | |
| 2012/0086238 A1 | 4/2012 | Tan | |
| 2012/0103714 A1 | 5/2012 | Choi et al. | |
| 2016/0229456 A1 * | 8/2016 | Boettcher | B62D 25/025 |
| 2017/0015361 A1 * | 1/2017 | Koch | B62D 25/025 |

FOREIGN PATENT DOCUMENTS

| | | | | |
|---|---|---|---|---|
| DE | 19934666 A1 * | 1/2001 | | B62D 21/152 |
| DE | 10214051 A1 * | 10/2003 | | B62D 21/152 |
| DE | 102010030535 A1 | 11/2011 | | |
| DE | 102012214748 A1 * | 5/2014 | | B62D 25/025 |
| DE | 102013004852 A1 * | 9/2014 | | B62D 25/025 |
| DE | 102014001092 A1 * | 7/2015 | | B62D 21/157 |
| DE | 102014016024 A1 * | 5/2016 | | B60R 19/34 |
| EP | 2014539 A1 | 1/2009 | | |
| JP | S6418784 A | 1/1989 | | |
| JP | 08072740 A * | 3/1996 | | B62D 21/157 |
| JP | 2002120766 A * | 4/2002 | | B62D 21/157 |
| JP | WO 2013191093 A1 * | 12/2013 | | B62D 27/023 |
| WO | WO 2008056073 A1 * | 5/2008 | | B62D 21/152 |

\* cited by examiner

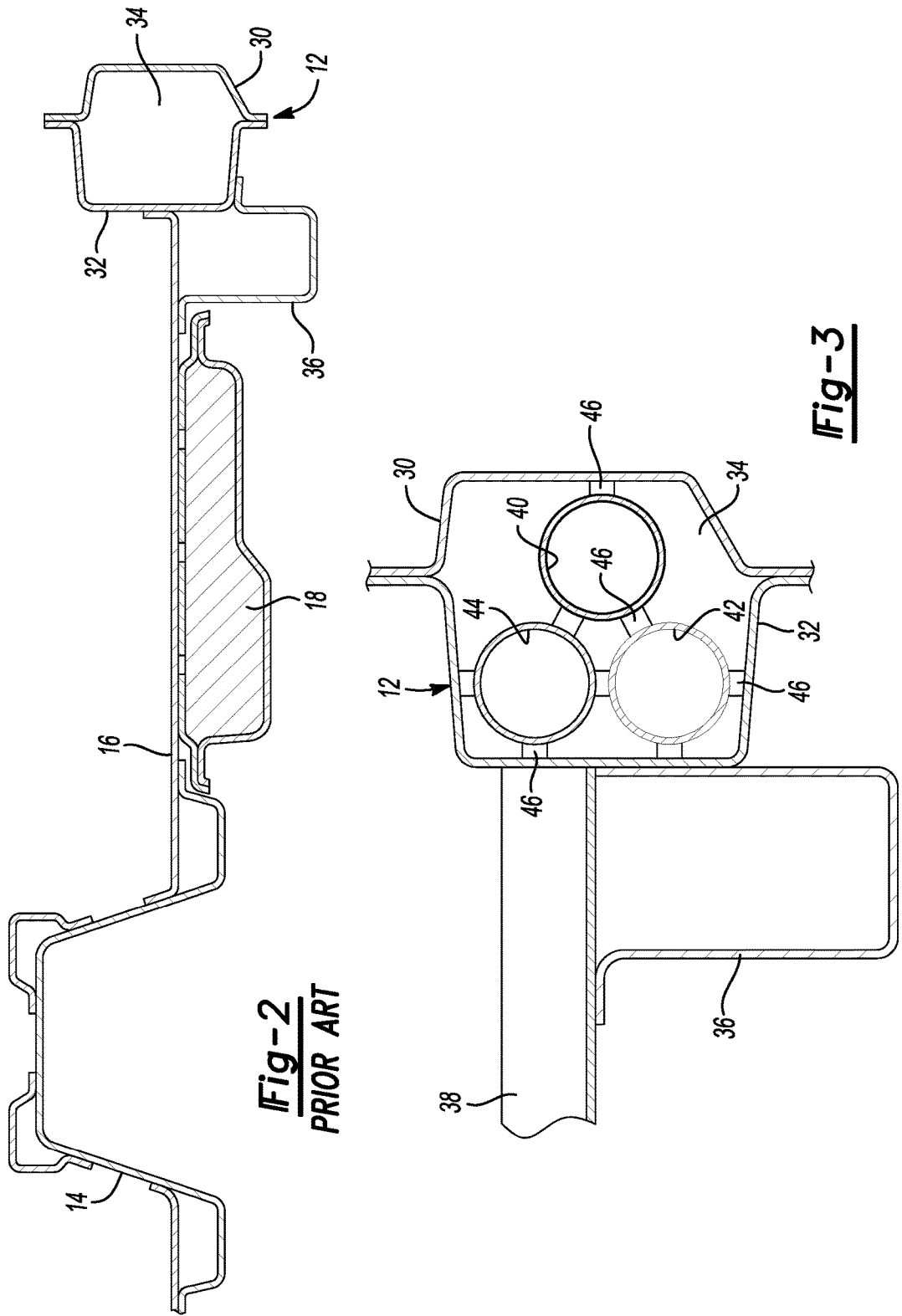

ROCKER INSERT FORMED BY CONNECTED TUBULAR MEMBERS

TECHNICAL FIELD

This disclosure relates to a rocker assembly for a vehicle including an insert having a plurality of connected tubular members and that reduces the extent of intrusion toward a battery pack and reduces acceleration of the battery pack in a side pole impact.

BACKGROUND

Rocker assemblies are provided between the front and rear wheel wells and below the doors of a vehicle to provide resistance to intrusion into the passenger compartment in side impact collisions. Rocker assemblies may include an outer rocker panel that is joined to a side sill. Various reinforcements have been proposed to strengthen rocker assemblies.

Electric vehicles may be provided with an underfloor mounted battery that powers an electric traction motor. Batteries for a hybrid electric vehicle may be attached between a central tunnel and the rocker assembly on both sides of the vehicle. Space is provided around the underfloor battery pack to reduce the potential for plastic deformation of the battery pack. If the rocker assembly is too soft it may provide inadequate protection from intrusion in side impact collisions.

Batteries for hybrid electric vehicles may be damaged internally by an impact. The battery pack may be damaged in a collision if the impact causes an acceleration spike, in particular, if the acceleration spike is of longer duration. If the rocker assembly is too rigid, acceleration of the battery caused by a side impact may create a longer spike of substantial duration and may cause damage to internal battery connections.

This disclosure is directed to solving the above problems and other problems as summarized below.

SUMMARY

According to one aspect of this disclosure, a rocker assembly is provided for a vehicle that comprises an outer panel, a side sill defining a cavity with the outer panel and an insert disposed in the cavity. The insert includes a plurality of longitudinally extending pipes connected with an adhesive to each other, the outer panel and the side sill. The wall thickness of one of the plurality of pipes is different than the wall thickness of another of the plurality of pipes.

According to another aspect of this disclosure, a rocker assembly is provided for a vehicle that comprises an outer panel, a side sill defining a cavity with the outer panel, and a plurality of tubular members. A first tubular member is adhesively connected to the outer panel inside the cavity. A second tubular member and a third tubular member extend in a longitudinal vehicle direction and are adhesively connected to the side sill and the first tubular member.

According a further aspect of this disclosure, an elongated beam is provided that comprises a first panel, a second panel attached to the first panel to define a cavity, and a reinforcement disposed in the cavity. The reinforcement includes a first tubular member adhesively connected to the first panel inside the cavity and a pair of tubular members adhesively connected to the second panel, to each other, and the first tubular member. The tubular members are arranged within the cavity to extend along the length of the elongated beam.

The above rocker assembly or beam may have pipes or tubular members that a cylindrical in shape. The pipes or tubular members may be connected in a triangular array with two of the pipes or tubular members being connected to the side sill and one of the pipes or tubular members being connected to the outer panel.

The above rocker assembly or elongated beam may be constructed so that the sum of the wall thickness of the two pipes connected to the side sill is greater than the wall thickness of the one pipe connected to the outer panel. The wall thickness of each of the two pipes connected to the side sill may be less than the wall thickness of the one pipe connected to the outer panel. The relative thickness of the pipes or tubular members are selected to collapse preferentially with the first pipe collapsing prior to the pair of pipes.

The above aspects and other aspects of this disclosure are described below with reference to the attached drawings.

BRIEF DESCRIPTION OF THE DRAWINGS

FIG. 2 is a fragmentary transverse cross-section view taken along the line 2-2 in FIG. 1 of a prior art vehicle having a conventional rocker assembly.

FIG. 3 is a fragmentary transverse cross-section view of a vehicle having a rocker assembly with an insert including a plurality of pipes or tubular members interconnected in a triangular array that is disposed in the rocker assembly.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
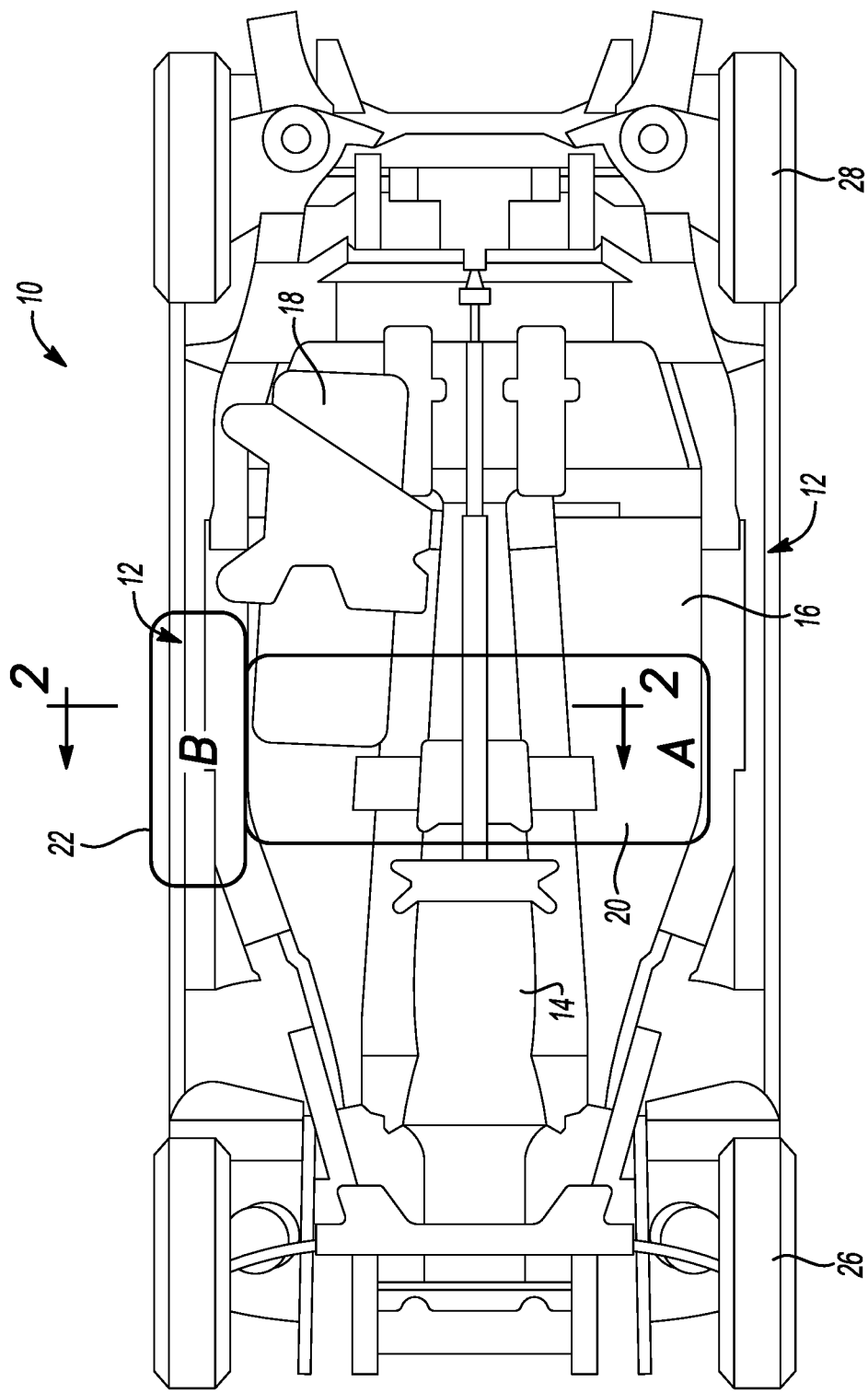
FIG. 1 is a diagrammatic bottom plan view of a prior art vehicle including a battery pack attached to the vehicle between the rocker assemblies and below the floor of the passenger compartment.

Referring to FIG. 1, the underbody of a vehicle 10 is illustrated. A rocker assembly 12, also referred to as an elongated beam, is provided on right and left sides of the vehicle 10. A central tunnel 14 extends longitudinally between the rocker assemblies 12 and forms part of the floor pan 16 of the vehicle 10. The floor pan 16 underlies the passenger compartment of the vehicle 10 and is illustrated with an underfloor battery 18 attached below the floor pan 16 with brackets of the underbody structure (not shown). A protected area box 20 is labelled with the letter "A" and an impact absorbing area box 22 is labelled with the letter "B". The vehicle 10 has a pair of front wheels 26 and a pair of rear wheels 28. The rocker assembly 12 extends between the wheel wells of the front wheels 26 and rear wheels 28. FIG. 1 is identified as a prior art, but it should be understood that the vehicle depicted in FIG. 1 may include the rocker insert formed by connected tubular members that are not visible because they are disposed within the rocker assembly 12.

Referring to FIG. 2, a prior art vehicle structure is shown to include a rocker assembly 12 on one side of the floor pan 16 and central tunnel 14. The rocker assembly 12 includes a rocker outer 30 and a side sill 32 that are assembled together to define the cavity 34. The under-floor battery 18 is shown secured below the floor pan 16 inboard of a sled runner beam 36 and the rocker assembly 12.

Referring to FIG. 3, the rocker assembly 12 is shown secured to the sled runner beam 36 and a cross member 38 that extends from the rocker assembly 12 inboard towards the central tunnel 14 (shown in FIGS. 1 and 2). The rocker assembly 12 is reinforced with an insert that is disposed in the cavity 34 defined by the rocker outer 30 and side sill 32. The insert includes an outer reinforcement pipe 40 (or tubular member), an inner/lower reinforcement pipe 42, and an inner/upper reinforcement pipe 44. The reinforcement pipes 40, 42 and 44 are secured together by a structural adhesive 46 and, in combination, comprise the insert. The structural adhesive 46 is also used to secure the outer reinforcement pipe 40 to the rocker outer 30. The inner/lower reinforcement pipe 42 and inner/upper reinforcement pipe 44 are secured by the structural adhesive 46 to the side sill 32.

Figure 4A:
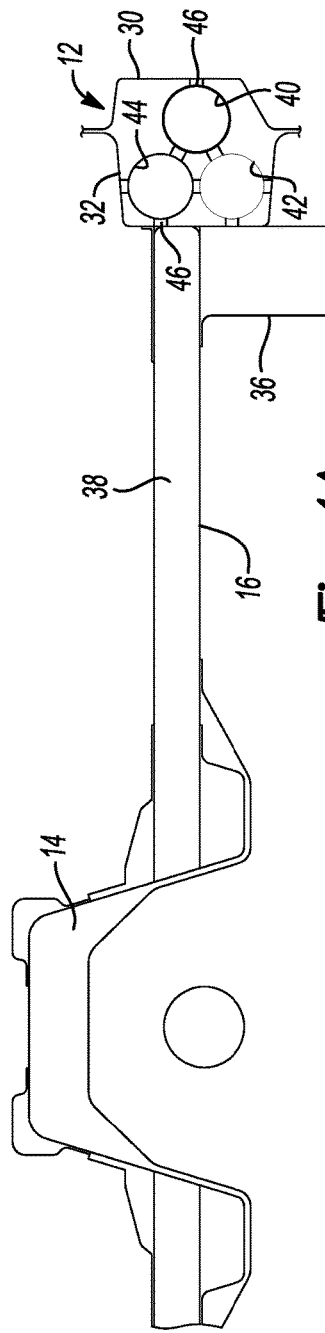
FIGS. 4A-4C illustrate a computer simulation of a side impact prior to impact (0 ms), at an intermediate point during the impact event (30 ms) and at the maximum intrusion of the impact event (50 ms).
Figure 4B:
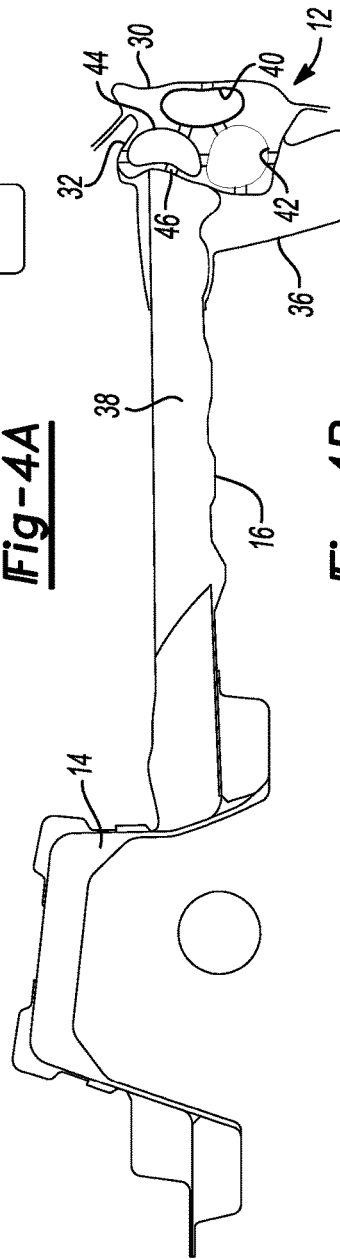
Figure 4C:
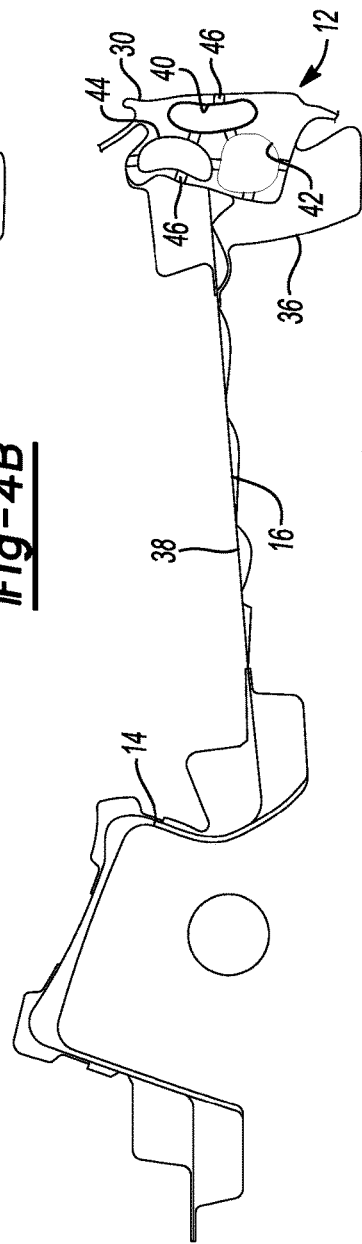

Referring to FIGS. 4A-4C, a computer simulation of a side impact is shown progressively at 0 ms, 30 ms and 50 ms during the course of a side impact collision.

Referring to FIG. 4A at 0 ms, the rocker assembly 12 is shown with the three reinforcement pipes, 40, 42 and 44 connected together and inside the rocker assembly 12 by the structural adhesive 46. The three reinforcement pipes are connected together in a triangular array and are also connected to the rocker outer 30 and side sill 32 as previously described. The rocker assembly is shown connected to the sled runner beam 36 and cross member 38. The cross member 38 is disposed above the floor pan 16 that extends to the central tunnel 14. It should be understood that the underfloor battery 18 (shown in FIGS. 1 and 2) is attached below the floor pan 16 between the sled runner beam 36 and the central tunnel 14.

Referring to FIG. 4B, the structure shown at 30 ms into a side collision event. At this point, the outer rocker panel is deformed and the pipes start to compress to absorb energy from the collision. At the 30 ms point, the outer single pipe deforms completely and the second layer of inner pipes begins to deform.

Referring to FIG. 4C, the side impact event is shown at 50 ms. At this point, the inner rocker panel and sled runner are partially deformed, but there is no cross member buckling. At 50 ms, the outer single pipe deforms completely and the gap between the pipes is diminished. Also at the 50 ms point, the inner pipes 42 and 44 are partially deformed. The outer pipe 40 deforms first with the second layer of inner pipes 42 and 44 deforming partially thereafter to facilitate progressive deformation of the rocker assembly insert.

Figure 5:
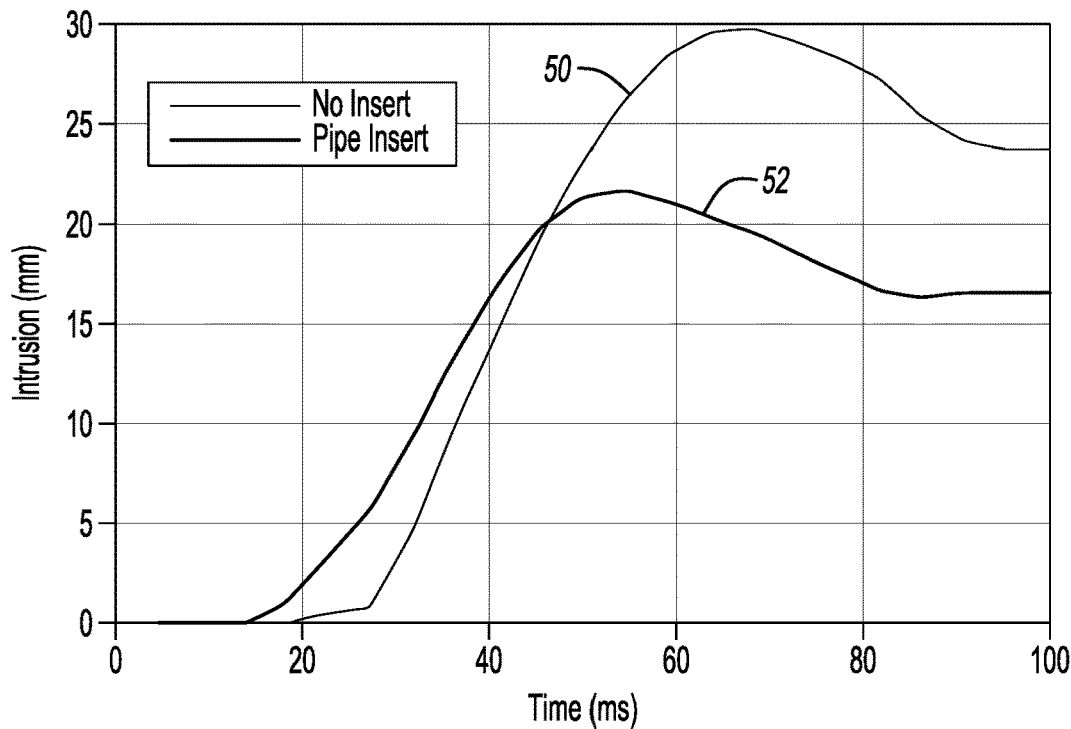
FIG. 5 is a graph comparing the extent of intrusion (mm) over time (ms) for a simulated impact applied to a rocker assembly without an insert to a rocker assembly with an insert.

Referring to FIG. 5, intrusion caused by a side impact collision with the baseline structure shown in FIG. 2 is shown to experience intrusion of a maximum of approximately 30 mm, while in the disclosed embodiment of the rocker assembly including the pipe inserts intrusion as shown by line 52 indicates that the maximum intrusion is reduced to approximately 22 mm. Maximum intrusion indicated by the baseline intrusion line 50 occurs at approximately 70 ms. The maximum intrusion for the disclosed embodiment as shown by line 52 occurs at approximately 55 ms.

Figure 6:
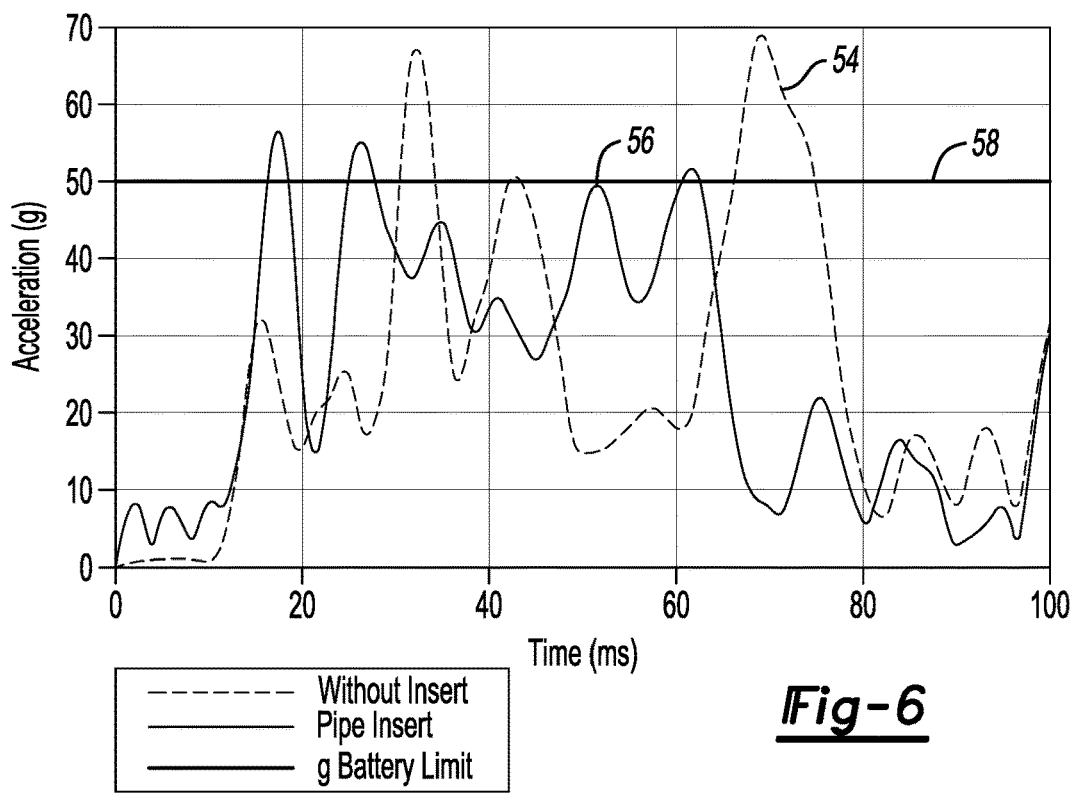
FIG. 6 is a graph comparing battery acceleration (g) over time (ms) for a simulated impact applied to a rocker assembly without an insert to a rocker assembly with an insert.

Referring to FIG. 6, a baseline battery acceleration line 54 is shown compared to a disclosed embodiment of the rocker assembly including the pipe inserts battery acceleration that is shown by line 56. A battery acceleration limit line 58 corresponds to a limit of acceleration that, if exceeded, may result in internal damage to battery connections. Battery acceleration is important for the protection of internal battery connections within the battery pack. Acceleration having excessive duration and high peaks may be detrimental to battery internal connections. Referring to the baseline battery acceleration line 54, it is shown that the maximum acceleration peak is approximately 69 g. The maximum battery acceleration for the disclosed embodiment as shown by line 56, is approximately 56 g. The duration of the maximum peak is less than 10 ms for the disclosed embodiment battery acceleration line 56. While the disclosed embodiment battery acceleration line 56 exceeds the battery acceleration limit line 58, the extent to which it exceeds the limit and short duration of the peak represents a significant improvement compared to the baseline battery acceleration in line 54 that has a peak that is 18% higher than the disclosed embodiment and that approaches 10 ms in duration. Resultant peak acceleration is decreased by 18% using the pipe inserts. It should also be noted that in the case of the disclosed embodiment, the acceleration peak is at an early stage in the graph of FIG. 6.

The reinforcement pipes 40, 42, 44 are provided with different wall thicknesses to provide a controlled degree of impact absorption and also reduce battery acceleration resulting from a side impact collision impacting the rocker assembly 12. For example, the outer reinforcement pipe 40 may have a wall thickness of 7 mm, the inner/lower reinforcement pipe 42 may have a wall thickness of 4 mm, and the inner/upper reinforcement pipe 44 may have a wall thickness of 5 mm. The reinforcement pipes, 40, 42, 44 are connected in a triangular array with two pipes being connected to the side sill 32 and one of the pipes being connected to the outer panel. In at least one embodiment, the sum of the wall thicknesses of the two inner reinforcement pipes connected to the side sill is greater than the sum of the wall thickness of the reinforcement pipe connected to the outer panel. While the sum of the wall thicknesses of the inner pipes is greater than the wall thickness of the pipe connected to the outer panel, the wall thickness of each of the two pipes connected to the side sill may be less than the wall thickness of the pipe connected to the outer panel. The outer reinforcement pipe connected to the outer panel is intended to collapse preferentially relative to the two pipes connected to the side sill.

The tubular members are preferably cylindrical tubular members 40, 42, 44 and may be aluminum pipes having the desired wall thicknesses. Alternatively, the tubular members may be selected based upon bending strength instead of wall thickness. If so, the bending strength of the outer reinforcement pipe 40 would be selected to be less than the combined strength of the two inner pipes 42, 44. The bending strength of the pipes may be related to wall thickness or may be related to the material or heat treatment of the pipes.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A rocker assembly for a vehicle comprising:
an outer panel;
a side sill defining a cavity with the outer panel; and
an insert disposed in the cavity that includes a plurality of longitudinally extending cylindrical tubular pipes connected with an adhesive to each other, the outer panel and the side sill, wherein a wall thickness of one of the plurality of pipes is different than a wall thickness of another of the plurality of pipes.

2. The rocker assembly of claim 1 wherein the plurality of pipes further comprises three pipes connected in a triangular array with two of the pipes being connected to the side sill and one of the pipes connected to the outer panel.

3. The rocker assembly of claim 2 wherein the one pipe connected to the outer panel collapses preferentially relative to the two pipes connected to the side sill.

4. The rocker assembly of claim 2 wherein a sum of the wall thickness of the two pipes connected to the side sill is greater than the wall thickness of the one pipe connected to the outer panel.

5. The rocker assembly of claim 4 wherein the wall thickness of each of the two pipes connected to the side sill is less than the wall thickness of the one pipe connected to the outer panel.

6. A rocker assembly for a vehicle comprising:
an outer panel;
a side sill defining a cavity with the outer panel;
a first cylindrical tubular member adhesively connected to the outer panel inside the cavity; and
a second and third cylindrical tubular members adhesively connected to the side sill and the first cylindrical tubular member, wherein the cylindrical tubular members are all connected to each other in a triangular array.

7. The rocker assembly of claim 6 wherein the second tubular member and third tubular member each have a wall thickness, and wherein a sum of the wall thickness of the second tubular member and third tubular member is greater than the wall thickness of the first tubular member.

8. The rocker assembly of claim 6 wherein a wall thickness of each of the second tubular member and third tubular member connected to the side sill is less than the wall thickness of the first tubular member connected to the outer panel.

9. The rocker assembly of claim 6 wherein the first tubular member connected to the outer panel collapses preferentially relative to the second and third tubular members connected to the side sill.

10. An elongated beam comprising:
a first panel;
a second panel attached to the first panel to define a cavity; and
a reinforcement disposed in the cavity including a first cylindrical tubular member adhesively connected to the first panel inside the cavity and a pair of cylindrical tubular members adhesively connected to the second panel, to each other, and the first cylindrical tubular member, wherein all of the cylindrical tubular members extend along a length of the elongated beam.

11. The beam of claim 10 wherein the first tubular member and the pair of tubular members are connected in a triangular array.

12. The beam of claim 10 wherein the first tubular member connected to the first panel collapses preferentially relative to the pair of tubular members connected to the second panel.

13. The beam of claim 10 wherein a sum of a wall thickness of the pair of tubular members that are connected to the second panel is greater than a wall thickness of the first tubular member that is connected to the first panel.

14. The beam of claim 13 wherein a wall thickness of each of the pair of tubular members connected to the second panel is less than the wall thickness of the first tubular member connected to the first panel.

* * * * *